3,443,952
PHOTOGRAPHIC MATERIALS FOR THE SILVER DYESTUFF BLEACHING PROCESS

Walter Anderau, Marly-le-Grand, Switzerland, assignor to Ciba Limited, Basel, Switzerland, a Swiss company
No Drawing. Filed Oct. 26, 1965, Ser. No. 505,235
Claims priority, application Switzerland, Nov. 9, 1964, 14,432/64
Int. Cl. G03c 1/10
U.S. Cl. 96—99    4 Claims

ABSTRACT OF THE DISCLOSURE

Photographic material for the silver dyestuff bleaching process. This material contains on a support a layer containing silver halide and at least one yellow dyestuff of the formula

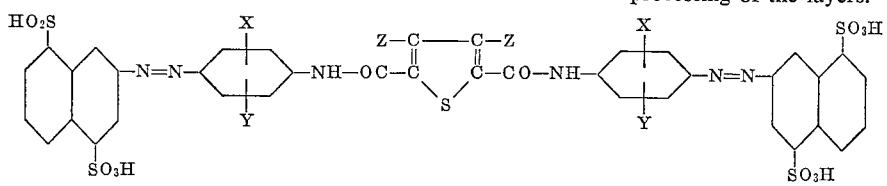

in which X represents a hydrogen atom, an alkyl, alkoxy, hydroxyalkoxy or alkoxyalkoxy group, Y represents a hydrogen atom or an alkyl group and Z represents a hydrogen atom or a methyl group. These dyestuffs have an absorption maximum between 430 and 450 m$\mu$, are highly transparent above 450 m$\mu$ and behave well during casting, drying and processing.

---

A yellow dyestuff which is to be used in photographic material to be processed by the silver dyestuff bleaching process for the production of images having a high degree of light fastness and which are also otherwise permanent must possess a wide range of properties. Its absorption maximum must be between 430 and 450 m$\mu$ and it must be highly transparent in the range above 450 m$\mu$, or in other words, the absorption curve must show a sharp drop A yellow dyestuff having an absorption maximum below 420 m$\mu$ may be designated a greenish yellow but it is of no use in three-color material when color densities suitable for mixed colors cannot be achieved with it. The dyestuff must also be nondiffusing. If the possession of this property depends on a paucity of groups imparting solubility in water, for example, carboxylic acid or sulfonic acid groups, the poor solubility of the dyestuff renders coloration of the gelatine difficult, and it is particularly difficult to achieve uniform coloration. Furthermore, opalescent molecular association tends to occur in the layer in the case of such dyestuffs with the result that the layers become opaque, especially when strongly acidic baths or baths containing a high concentration of salt are used. Sparingly soluble dyestuffs can also have a precipitating action on the gelatine; very fine flocculation takes place and the precipitate is very difficult to bleach completely. This makes it impossible to produce a pure white. Some dyestuffs or the decomposition products thereof also prevent the bleaching of other layer dyestuffs. Finally, it is essential that the dyestuffs also possess a good fastness to light.

This invention is based on the observation that the yellow dyestuffs having the general Formula 1 given below which, in accordance with the invention, are present in photographic layers, meet the above-mentioned requirements particularly well in respect of asborption maxima, transparency and behaviour during casting, drying and processing of the layers.

Accordingly, the present invention provides photographic materials for the silver dyestuffs bleaching process which comprise on a support a layer containing at least one dyestuff of the formula (1)
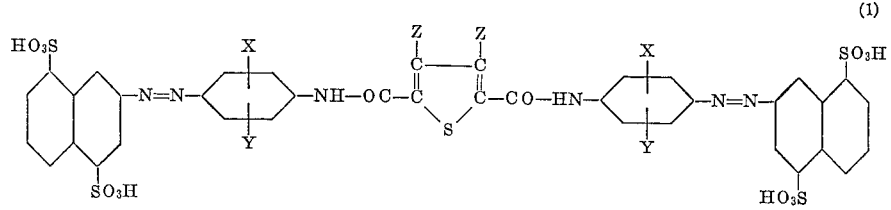

in which X represents a hydrogen atom or an alkyl, alkoxy, hydroxyalkoxy or an alkoxyalkoxy group, Y represents a hydrogen atom or an alkyl group and Z represents a hydrogen atom or a hydrocarbon residue.

Preference is given to dyestuffs of the formula (2)
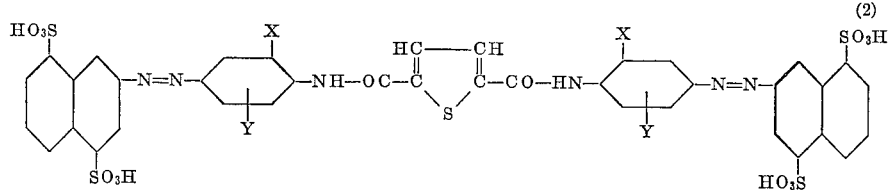

in which X and Y have the meanings given above. The substituent Y is preferably in ortho-position to the azo group, and the single substituents advantageously contain not more than four carbon atoms.

The dyestuffs of the Formula 1 may be prepared by reacting a dihalide of a thiophene-2,5-carboxylic acid which may be further substituted in 3- and 4-positions by hydrocarbon residues, for example, phenyl groups, with an aminoazo dyestuff of the formula (3)
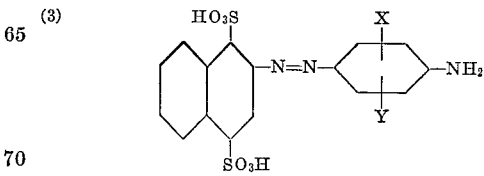

in which X and Y have the meanings given above, in a molar ratio of 1:2. It is advantageous to use thiophene-2,5- dicarboxylic acid chloride for this reaction. The aminoazo dyestuffs of the Formula 3 are obtainable by coupling diazotized 2-aminonaphthalene-4,8-disulphonic acid with an aminobenzene containing the substituents X and Y indicated above. The following may be mentioned as examples of coupling components: aminobenzene, 1-amino-2- or 3-methylbenzene, 1-amino-2,5- or 2,6-dimethylbenzene, 1-amino-2- or 3-methoxybenzene, 1-amino-2-ethoxybenzene, 1-amino-2-β-hydroxyethoxybenzene, 1-amino-2-β-methoxyethoxy-5-methylbenzene, 1-amino-2-β-hydroxyethoxy-5-methylbenzene and especially 1-amino-2-methoxy-5-methylbenzene.

The dyestuffs of the Formulae 1, 2 and 3 can be prepared by known methods. Coupling to form the aminoazo dyestuffs is carried out in an acid medium; amines that are difficult to couple may be coupled in the form of their ω-methane-sulphonic acids, the methane-sulphonic acid group being subsequently split off. The aminoazo dyestuffs are advantageously reacted with the thiophenedicarboxylic acid halide in the presence of an agent capable of binding acid. The photographic layers which, in accordance with the invention, contain at least one dyestuff of the Formula 1, can also be prepared and used for the production of colored photographic images in known manner. In particular, the dyestuffs of the Formula 1 may be present in multilayer material which contains on a support a red-sensitized layer colored with a cyan dyestuff, a green-sensitized layer colored with a magenta dyestuff and, finally, a blue-sensitized layer containing a dyestuff of the Formula 1.

The following examples illustrate the invention. Unless otherwise stated, the parts and percentages are by weight.

Example 1

12 milligrams of the dyestuff of the formula (4)

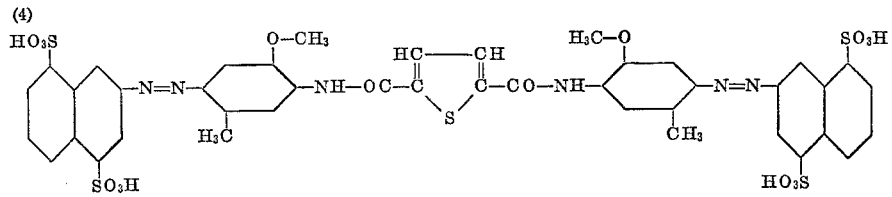

were dissolved in 2 cc. of distilled water at 70° C. The solution was cooled to 40° C. and added to 3.5 cc. of 6% aqueous gelatine havng a temperature of 40° C. 3.3 cc. of a gelatine/silver bromide emulsion having a temperature of 40° C. were then added. If desired or required, 1 to 2 cc. of an aqueous solution of a spreading agent, for example, saponine, and a hardening agent, for example, dimethylolurea could be added. The mixture so prepared was cast on a glass plate measuring 13 cm. x 18 cm. and dried.

The layer was then exposed behind a stepped wedge and the silver image developed in a 1-methylamino-4-hydroxybenzene sulphate hydroquinone developer and fixed.

The image dyestuff was then bleached out, in accordance with the amount of silver present, in a bath containing 30 to 100 parts by volume of 32% hydrochloric acid, 40 to 120 parts of potassium bromide, 30 to 50 parts of thiourea and 0.001 to 0.01 parts of 2-amino-3-hydroxyphenazine per 1,000 parts by volume. Subsequently, excess silver was removed in a bath containing 100 parts of sodium chloride, 100 parts of copper sulphate crystals and 50 parts by volume of 37% hydrochloric acid per 1,000 parts by volume. Fixation was then carried out in the usual manner. A yellow wedge was obtained which was the inverse image of the silver wedge and which was bleached pure white at the areas where the silver was present at greatest density. A yellow image of the kind described could also form a part of multicolor material; in this case the amount of gelatine used was adapted to suit the thickness of layer required.

Similar results were obtained when the dyestuff of the Formula 4 was replaced by a symmetrical diazo dyestuff which also contained two residues of 2-aminonaphthalene-4,8-disulfonic acid, two residues of the formula

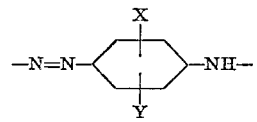

and one residue of the formula

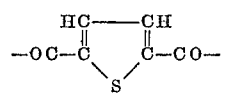

Examples of the residue

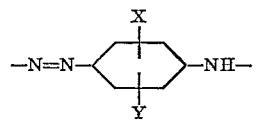

are:

1.
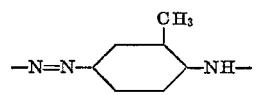

2.
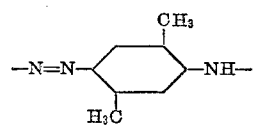

3.
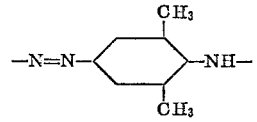

4.
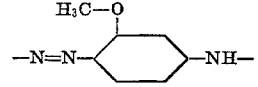

5.
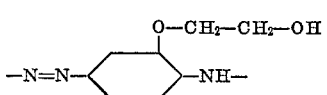

6.
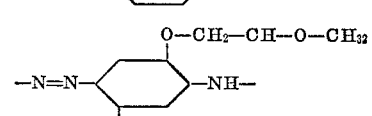

7.
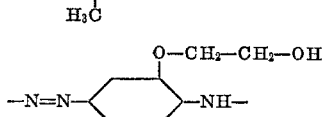

8.
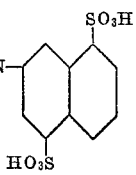

9.
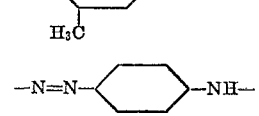

and:

The dyestuff of the Formula 4 could be prepared in the following manner:

60.6 parts of 2-aminonaphthalene-4,8-disulphonic acid in the form of the sodium salt were dissolved in 1,000 parts of water, the solution cooled to 0° C. with ice and diazotized in the usual manner with 65 parts of 37% hydrochloric acid and 14 parts of sodium nitrite. 30.5 parts of 2-methoxy-5-methyl-1-aminobenzene were dissolved at 60 to 70° C. in 300 parts of water and 30 parts of 37% hydrochloric acid, the solution cooled to 5° C. with ice and added to the solution of the diazo compound. The batch was stirred for 24 hours at 8 to 15° C., during which period coupling to form the aminomonoazo dyestuff was completed. The time required for coupling could be shortened by buffering the mineral acid with sodium acetate. The acidic suspension of the monoazo dyestuff was heated to 65° C. and then filtered at 30° C.

The precipitated monoazo dyestuff was suspended in 1,000 parts of water, dissolved and neutralized with sodium carbonate and the solution then made slightly alkaline with sodium carbonate. The solution was heated to 25±2° C. and 30 parts of sodium acetate crystals were added followed by 22 to 24 parts of thiophene-2,5-dicarboxylic acid dichloride dissolved in 100 parts of acetone. The reaction took 15 to 20 hours to complete at 25° C. If necessary, sodium hydroxide could be added to maintain the pH value at 9 to 9.4. After the condensation the batch was heated to 65° C. and 12 parts of sodium carbonate added. After cooling the reaction mixture to 40° C. it was filtered and the by-products washed out of the condensate with ethanol and acetone. The dyestuff was then dried. The dyestuff could be manufactured almost completely free from salt, the procedure being to stir the moist paste into distilled water, heating the suspension to 50° C., improving the form of the suspension by the addition of a small amount of potassium acetate solution to make it readily filterable and then filtering the suspension, washing the potassium acetate out of the press cake with alcohol and drying.

Dyestuffs containing the residues 1 to 9 indicated above could also be prepared by this procedure, the constitution of the starting materials being indicated by the formulae.

Example 2

The following layers were applied in the sequence indicated to a white opaque acetate film provided with an adhesive layer:

(1) A red-sensitized silver bromide emulsion in gelatine containing the cyan dyestuff of the formula (5)

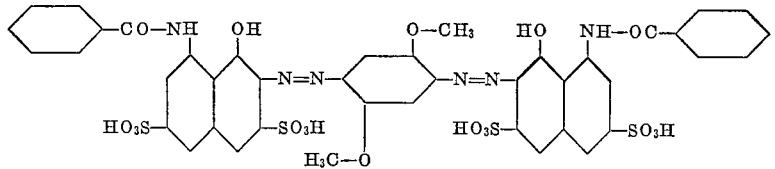

(2) A colourless gelatine layer free from silver halide.
(3) A green-sensitized silver bromide emulsion in gelatine containing the magenta dyestuff of the formula (6)

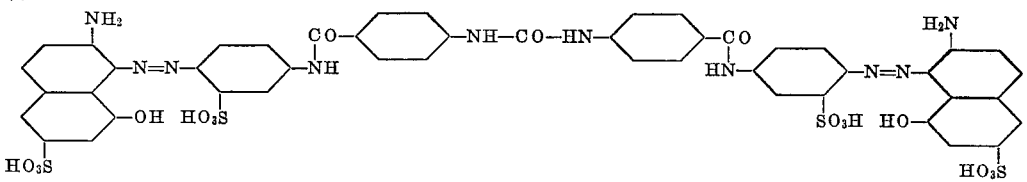

(4) A yellow filter layer containing the dyestuff of the formula (7)

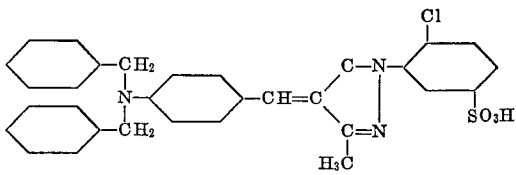

(5) A blue-sensitized silver bromide emulsion in gelatine containing the yellow dyestuff of the Formula 4.

The gelatine layers could also contain additives for example wetting agents, hardening agents and stabilizers for the silver halide. The material was manufactured in a manner such that the single layers contained, per square meter of film, 0.5 gram of dyestuff and silver bromide in an amount corresponding to 1 to 1.2 grams of silver.

The film so prepared was exposed beneath a colored diapositive to red, green and blue light. The reproduction was then developed according to the following procedure:
(1) Developing for 6 minues in a bath containing 50 grams of anhydrous sodium sulphate, 0.2 gram of 1-phenyl-3-pyrazolidone, 6 grams of hydroquinone, 35 grams of anhydrous sodium carbonate, 4 grams of potassium bromide and 0.3 gram of benztriazole per liter of water;
(2) Washing with water for 5 minues;
(3) Fixing for 6 minutes in a solution of 200 grams of Similar good results could be obtained by incorporat-
 sodium thiosulphate crystals and 20 grams of potassium metabisulfite in 1 liter of water;
(4) Washing with water for 5 minutes;
(5) Bleaching of the dyestuffs for 3 to 12 minutes with a solution containing, per liter of water, 50 to 80 grams of potassium bromide, 40 to 80 grams of thiourea, 35 to 80 grams of 30% sulphuric acid and, if desired, 0.01 gram of 2-amino-3-hydroxyphenazine;
(6) Washing with water for 10 minutes;
(7) Bleaching of the residual silver for 5 minutes with a solution of 60 grams of copper sulfate crystals, 80 grams of potassium bromide and 15 ml. of 30% hydrochloric acid in one liter of water;
(8) Washing with water for 5 minutes;
(9) Fixing for 5 minutes in the manner described under 3;
(10) Washing with water for 5 minutes.

A positive image to be viewed in incident light was obtained which was fast to light and which is also otherwise permanent.

Similar good results could be obtained by incorporating any one of the yellow dyestuffs containing the residues 1 to 9 in the blue-sensitized layer instead of the dyestuff of the Formula 4.

Example 3

The procedure was the same as that described in Examples 1 or 2 but the yellow dyestuff of the Formula 4 was replaced by the dyestuff of the formula

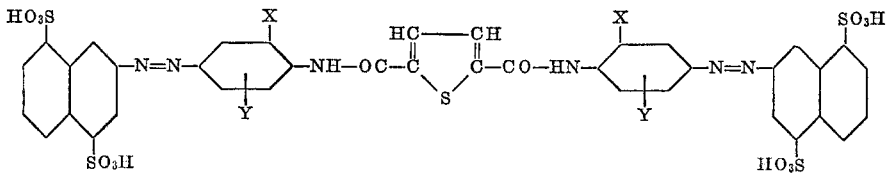

(8)

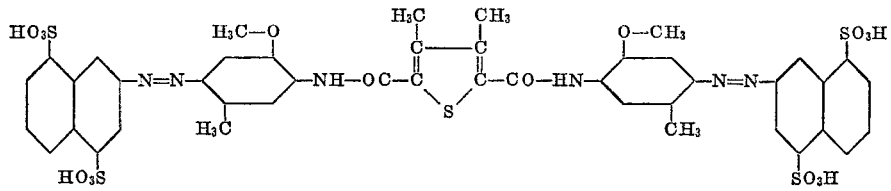

This dyestuff was prepared in a manner analogous to that described in Example 1 except that the 20 to 24 parts of thiophene-2,5-dicarboxylic acid dichloride were replaced by 25 to 28 parts of 3,4-dimethyl-thiophene-2,5-dicarboxylic acid dichloride.

What is claimed is:

1. Photographic materials for the silver dyestuff bleaching process which comprises on a support a layer containing silver halide and at least one dyestuff of the formula

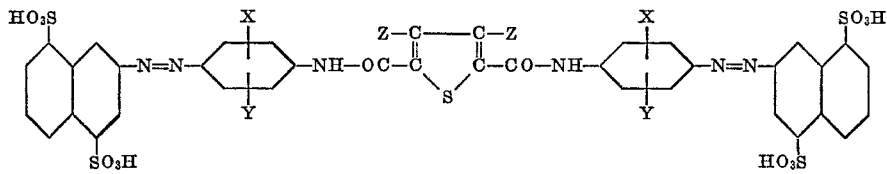

in which X represent a hydrogen atom or an alkyl, alkoxy, hydroxyalkoxy or alkoxyalkoxy group, Y represents a hydrogen atom or an alkyl group and Z represents a hydrogen atom or a methyl group.

2. Photographic materials as claimed in claim 1 in which one layer contains silver halide and a dyestuff of the formula

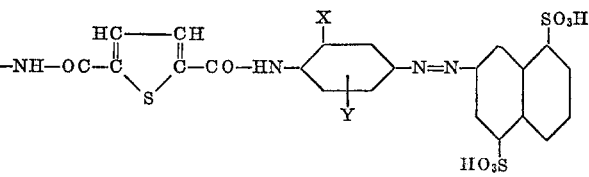

in which X represents a hydrogen atom or an alkyl, alkoxy, hydroxyalkoxy or alkoxyalkoxy group and Y represents a hydrogen atom or an alkyl group.

3. Photographic materials as claimed in claim 1 in which one layer contains silver halide, and a dyestuff of the formula given in which the substituent Y is in orthoposition to the azo group and each substitutent contains not more than four carbon atoms.

4. Photographic materials as claimed in claim 1 in which one layer contains silver halide and the dyestuff of the formula

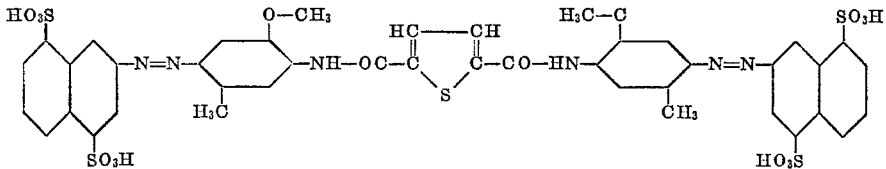

References Cited

UNITED STATES PATENTS 2,899,305  8/1959  Bossard et al. _____ 96—99
3,178,291  4/1965  Mory et al. _____ 96—99

J. TRAVIS BROWN, Primary Examiner.

U.S. Cl. X.R.

96—20, 73; 260—152

PO-1050
(5/69)

UNITED STATES PATENT OFFICE
CERTIFICATE OF CORRECTION

Patent No. 3,443,952          Dated May 13, 1969

Inventor(s) WALTER ANDERAU

It is certified that error appears in the above-identified patent and that said Letters Patent are hereby corrected as shown below:

Column 8, claim 4, in the formula, that portion reading

" 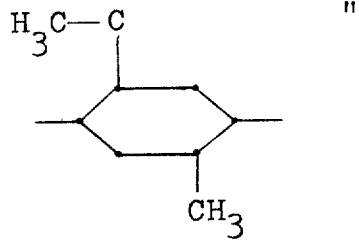 "

should read ---

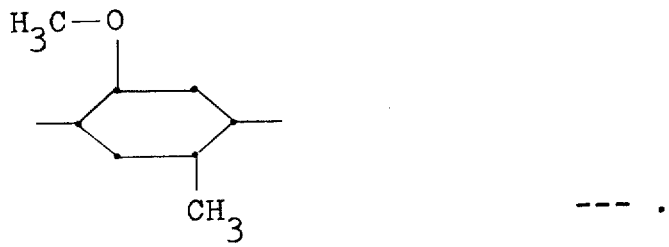

SIGNED AND
                                                                   SEALED
                                                                NOV 18 1969

(SEAL)
Attest:

Edward M. Fletcher, Jr.                          WILLIAM E. SCHUYLER, JR.
Attesting Officer                              Commissioner of Patents